United States Patent [19]

Godon

[11] Patent Number: 4,794,941

[45] Date of Patent: Jan. 3, 1989

[54] TORQUE MOTOR WITH HYDRAULIC POTENTIOMETER FOR SERVO-DISTRIBUTOR

[75] Inventor: Gerárd Godon, Rueil Malmaison, France

[73] Assignee: Societe D'Applications Des Machines Motrices, France

[21] Appl. No.: 186,402

[22] Filed: Apr. 26, 1988

Related U.S. Application Data

[63] Continuation of Ser. No. 903,180, Sep. 3, 1986, abandoned.

[51] Int. Cl.[4] .................... G05D 16/00

[52] U.S. Cl. .................... 137/82; 335/181; 137/625.64

[58] Field of Search .................... 137/82, 625.64; 335/177, 179, 180, 181; 251/129.1

[56] References Cited

U.S. PATENT DOCUMENTS 3,156,798 11/1904 Rights .................... 335/179 X 3,712,339 11/1973 Bartholmaus .................... 137/625.64

*Primary Examiner*—Alan Cohan

*Attorney, Agent, or Firm*—Sughrue, Mion, Zinn, Macpeak & Seas

[57] ABSTRACT

A torque motor (M) for the hydraulic potentiometer (P) of a servo-distributor intended in particular for the control of jacks and hydraulic motors, comprising magnets fixed to fixed members (1, 2) in which an armature (3) is arranged whose ends are separated from the fixed members (1, 2) by air-gaps (y) and around which armature are mounted two induction coils (4, 5) which are capable of being supplied with electrical current, and a blade (12) which is fixed by one of its ends to a flexion tube (9) which is connected to the armature (3) by its corresponding end. There are four parallelepipedal or cylindrical magnets (23, 24, 25, 26), which are made of a suitable alloy with a strong coercive field, one pair of which is placed at each end of the armature (3). These magnets are easier to manufacture, to machine and to fix in the motor than conventional magnets and at the same time have a much higher coercive field.

3 Claims, 2 Drawing Sheets

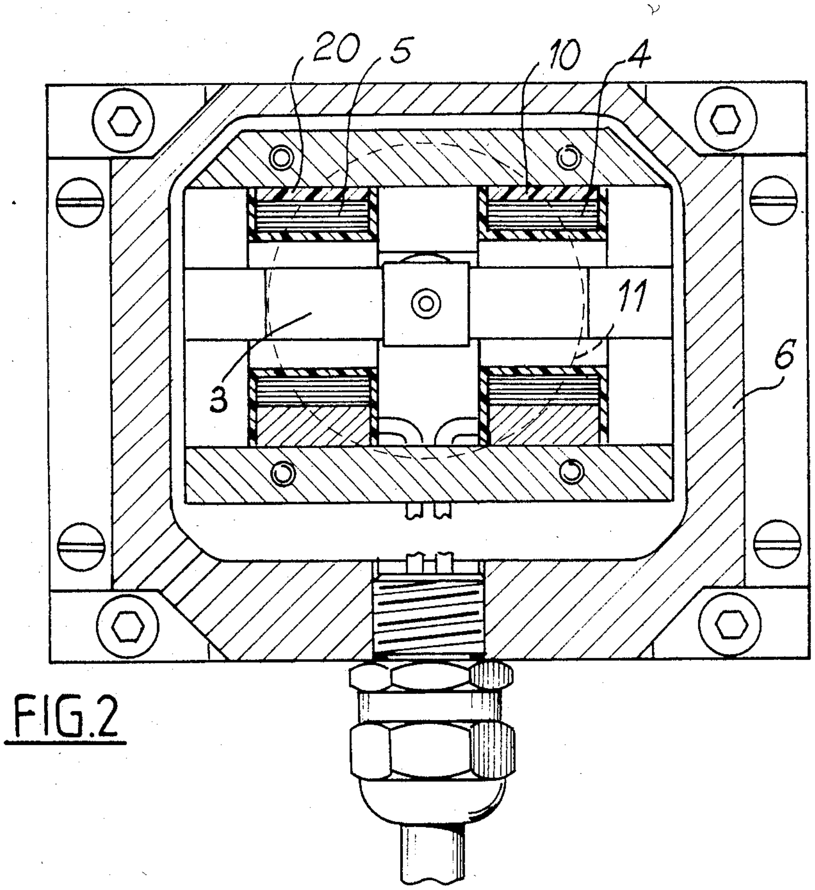
FIG.2
FIG.3
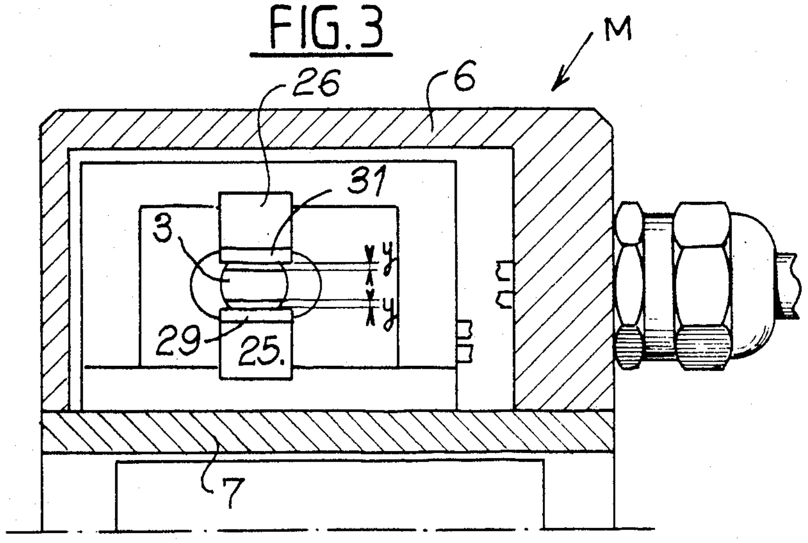

TORQUE MOTOR WITH HYDRAULIC POTENTIOMETER FOR SERVO-DISTRIBUTOR

This is a continuation of application Ser. No. 903,180, filed Sept. 3, 1986, now abandoned.

BACKGROUND OF THE INVENTION

The present invention relates to a torque motor with a hydraulic potentiometer for a servo-distributor, intended in particular for the control of jacks and hydraulic motors.

This type of torque motor is intended to control a hydraulic potentiometer composed of four nozzles mounted in a bridge. The output of the torque motor, which is called a blade, causes the cross-section of two nozzles to vary, which generates a pressure differential proportional to the control current of the torque motor.

The torque motor comprises magnets fixed to fixed members in which there is arranged an armature whose ends are separated from the fixed members by an air-gap, and around which armature there are mounted two induction coils which are capable of being supplied with electrical current. The blade is fixed by one of its ends to a flexion tube which is connected to the armature by its corresponding end.

The symmetry of the magnetic circuit assures that no torque acts on the armature in the absence of current in the coils. On the other hand, when these coils are supplied with current in the suitable direction so as to cause their magnetic fields to be added, each end of the armature is polarized and is subjected, in the air-gaps, to an electromagnetic force which creates a torque causing bending of the tube, which in turn moves the blade between the two associated nozzles.

Certain torque motors are provided with a single magnet and others with two. These magnets are generally U-shaped and have housing machined therein for fixing screws to the fixed members. The result is that those magnets have a relatively complicated geometry which causes manufacturing difficulties. In addition, they occupy considerable space and have a low coercive field, such that if the motor is disassembled, they must subsequently be remagnetized before reassembly.

SUMMARY OF THE INVENTION

The object of the invention is to overcome these disadvantages by producing a torque motor provided with magnets which have a simplified shape and are therefore easy to manufacture, occupy reduced space and have a strong coercive field.

In accordance with the invention, the torque motor is provided with four parallelepipedal or cylindrical magnets which are made of a suitable alloy with a strong coercive field and are placed in pairs at each end of the armature.

In accordance with a first embodiment of the invention, the magnets are composed of an alloy based on rare earth and cobalt, for example a samarium-cobalt alloy.

With a size equal to that of conventional magnets, this type of magnet has an induction force which it two to three times higher and, in addition, has a strong coercive field. They can, therefore, occupy far less space and have a much lower weight than the conventional magnets used to date in the torque motors which are the object of the invention.

However, with this type of magnet, it is very difficult to make the bores for the passage of the assembly screws as compared with conventional magnets. However, due specifically to their considerably lower weight and the fact that they occupy much less space, they can be connected to the fixed members of the motor by simple gluing.

BRIEF DESCRIPTION OF THE DRAWINGS

Other particular features and advantages of the invention will become apparent from the following description, which is given with reference to the attached drawings which illustrate, by way of a non-limiting example, one embodiment:

FIG. 2 is a cross-section along II—II of FIG. 1;

FIG. 3 is a lateral elevation along the direction of the arrow K of FIG. 1 (lateral surface of the withdrawn cover).

DETAILED DESCRIPTION OF A PREFERRED EMBODIMENT

Figure 1:
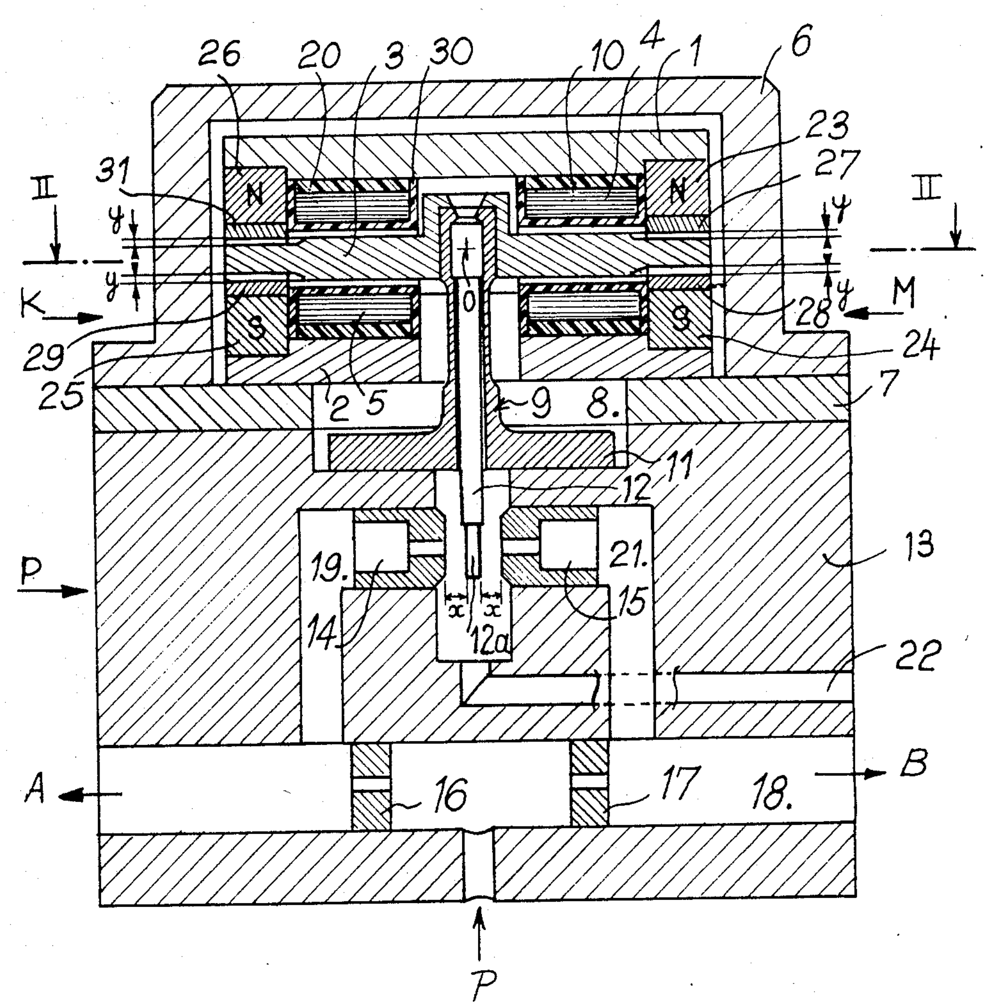
FIG. 1 is an axial cross-section of an embodiment of the torque motor in accordance with the invention and of the hydraulic potentiometer associated with said motor.

The device shown in the drawings comprises a torque motor designated by the general reference M which is the object of the invention, and a hydraulic potentiometer P, which is known per se, arranged so as to be controlled by the motor M so as to generate a differential pressure, which can itself be used for the control of various components, such as jacks or hydraulic motors.

The torque motor M comprises two metal fixed members 1 and 2, in which an armature 3 is arranged, and around which are wound two induction coils 4, 5 which are capable of being supplied with electric current from an electric source which is not shown. The coils 4, 5 are each covered with a plastic coating 10, 20 and are housed in a support 30. The above-identified components are covered with a protective cover 6 fixed to a base 7 which is centrally bored with an orifice 8 which is traversed by a flexion tube 9, one end of which is fixed to the armature 3 by being embedded into the median part thereof.

At the end of the flexion tube 9 opposite core 3 is a disc 11. The tube contains a blade 12, one end of which is embedded in the flexion tube 9. Disc 11 is fixed to the body 13 of the hydraulic potentiometer P, while the free end 12*a* of the blade 12 is positioned between two nozzles 14, 15, at an equal distance x from each one. Body 13 is provided internally with two other nozzles 16, 17 which are housed in a pipe 18 which transverses body 13 from side to side with outlets A and B, while the hydraulic pressure P comes into the pipe 18 between the two nozzles 16 and 17.

Downstream of the nozzles 16, 17, pipe 18 communicates with two pipes 19, 21 which open, respectively, onto the nozzles 14 and 15, which, in turn, allow the passage of the hydraulic liquid into a chamber which is extended by a return pipe 22 to the hydraulic reservoir R (not shown).

In accordance with the invention, the torque motor M is provided with four magnets 23, 24, 25, 26, which in this embodiment have a parallelepipedal shape and are fixed to the members 1, 2, with a pair of magnets mounted transversely on each side of an end of armature.

Magnets 23–26 have north poles=N and south poles=S which are positioned as indicated in FIG. 1 so that their inducton lines are appropriately closed in the magnetic circuit. They are encased in the ends of members 1, 2, in which the two induction coils 4, 5 are also encased. To each magnet 23, 24, 25, 26 there is fixed a corresponding wedge or shim 27, 28, 29, 31 whose thickness determines the width of the air-gap Y which separates the wedge from the end of armature 3.

The magnets 23, 24, 25, 26 are fixed to the members 1, 2 by gluing, and the wedges or shims 27, 28, 29, 31, which are for example made of soft iron, are also fixed to the respective magnets by gluing thereof.

The magnets are made of a material which, compared to a conventional magent of equal size, has a much higher induction force and a strong coercive field; they can therefore be composed of an alloy based on rare earth and cobalt, for example a samarium-cobalt alloy. It is also possible to use, for the production of components 23, 24, 25, 26, a neodymium-iron-boron alloy. These examples are only given by way of indication.

Likewise, the magnets can be produced in the shape of four cylindrical, rather than parallelepipedal, tablets. Using one of the alloys mentioned above enalbes, for an induction force equal to that of a conventional magnet, the considerable reduction of the dimensions and weight of each magnet, which can therefore be fixed to the corresponding member by simple gluing instead of by screws as in the prior art. At the same time, the simplicity of the geometry of magnets 23, 24, 25, 26 makes their machining easier and less expensive than that of conventional magnets.

Finally, due to their strong coercive field, it is no longer necessary to remagnetize the magnets after possibly disassembling the torque motor.

The device illustrated in the drawings operates in the following manner: the pressure P creates two discharges: one passes through the nozzles 16, 14, on the one hand, and the other through nozzles 17, 15, on the other hand, with these two discharges exiting from the potentiometer P through pipe 22 towards reservoir R. Since the free end 12*a* of blade 12 is at an equal distance x from nozzles 14, 15, the pressures at A and B are equal when no electric current passes through coils 4 and 5. In effect, no torque then acts on core 3.

However, when coils 4, 5 are supplied with current in an appropriate direction for their magnetic fields to combine, each end of armature 3 is polarized, is inside the gaps y and is subjected to an electromagnetic force which creates a torque in the central embedded zone O of the flexion tube 9 in the armature 3. This torque causes the tube 9 to bend, which then, during its movement, drives end 12*a* of blade 12. Said blade takes a balancing position when the reaction torque of the tube 9 is equal to the motor torque, while its free end comes nearer to one of the nozzles 14 or 15. If, for example, this free end comes nearer nozzle 14, that causes an increase in the hydraulic pressure at outlet A in relation to the pressure existing at outlet B. This pressure differential can be used as already indicated to activate any components whatsoever, such as a jack or hydraulic motor.

What is claimed is:

1. A torque motor (M) for a hydraulic potentiometer (P) of a servo-distributor intended in particular for the control of jacks and hydraulic motors, comprising magnets fixed to fixed members (1, 2) in which an armature (3) is arranged whose ends are separated from the fixed members (1, 2) by air-gaps (y) and around which armature are mounted two induction coils (4, 5) which are capable of being supplied with electrical current, and a blade (12) which is fixed by one of its ends to a flexion tube (9) which is connected to the armature (3) by its corresponding end, characterized in that said motor comprises four parallelepipedal or cylindrical magnets (23, 24, 25, 26), which are made of a suitable alloy with a strong coercive field, one pair of which are placed at each end of the armature (3);
   - wherein each magnet (23, 24, 25, 26) is fixed to a shim (27, 28, 29, 31) whose thickness determines the width of the corresponding air-gap (y); and
   - wherein the magnets (23, 24, 25, 26) are fixed to the fixed members by gluing, and the shims (27, 28, 29, 31) are also fixed to the magnets by gluing.

2. The motor in accordance with claim 1, wherein the magnets (23, 24, 25, 26) ar made of an alloy based on rare earth and cobalt, for example a samarium-cobalt alloy.

3. The motor in accordance with claim 1, wherein the magnets (23, 24, 25, 26) are composed of a neodymium-iron-boron alloy.

* * * * *